United States Patent [19]
Pahl

[11] 4,174,365
[45] * Nov. 13, 1979

[54] CONTINUOUS METHOD FOR MAKING HOSES WITH DESTRUCTION OF HORIZONTALLY DISPOSED MANDREL

[75] Inventor: Karl-Heinz Pahl, Düsseldorf-Lohausen, Fed. Rep. of Germany

[73] Assignee: Pahl'sche Gummi—und Asbest-Gesellschaft "PAGUAG", Düsseldorf, Fed. Rep. of Germany

[ * ] Notice: The portion of the term of this patent subsequent to Nov. 1, 1994, has been disclaimed.

[21] Appl. No.: 818,892

[22] Filed: Jul. 25, 1977

Related U.S. Application Data

[63] Continuation of Ser. No. 684,347, May 7, 1976, Pat. No. 4,056,596.

[30] Foreign Application Priority Data

May 10, 1975 [DE] Fed. Rep. of Germany ....... 2520853

[51] Int. Cl.² ...................... B29D 23/04; B29G 2/00; B29H 7/14
[52] U.S. Cl. .................................. 264/146; 264/166; 264/173; 264/176 R; 264/209; 264/221; 264/225; 264/230; 264/317; 264/347; 425/133.5; 425/174.2; 425/174.8 E; 425/307; 425/463
[58] Field of Search ...................... 425/110, 113, 174.2, 425/90, DIG. 12, 392, 97, 174.8, 393, 176, 306, 335, 224, 381, 133.1, 475, 133.5, 307, 463; 29/423, 424; 156/155, 173, 73.1, 272; 264/221, 225, 317, 236, 250, 255, 342 R, 347, 166, 145, 165, 173, 299, 313, 209, 219, DIG. 44

[56] References Cited

U.S. PATENT DOCUMENTS

| | | | |
|---|---|---|---|
| 2,765,511 | 10/1956 | Greene | 264/317 |
| 3,214,313 | 10/1965 | Chisholm | 156/155 |
| 3,255,284 | 6/1966 | Meislohn | 264/317 |
| 3,479,419 | 11/1969 | Hochhauser | 264/347 |
| 3,690,796 | 9/1972 | Borsvold | 425/90 |
| 3,784,667 | 1/1974 | Drostholm et al. | 264/145 |
| 4,019,939 | 4/1977 | Drostholm et al. | 156/173 |
| 4,019,939 | 4/1977 | Barbier et al. | 264/326 |

Primary Examiner—W. E. Hoag
Attorney, Agent, or Firm—Sprung, Felfe, Horn, Lynch & Kramer

[57] ABSTRACT

A process for the continuous production of a hose formed and vulcanized on a mandrel, comprising continuously forming and advancing a hollow mandrel, continuously forming said hose about said mandrel and continuously vulcanizing said hose while advancing said hose in axial direction with said mandrel, after said mandrel arrives at a predetermined location continuously destroying said mandrel within said hose, and removing the remnants of said mandrel from said hose. The mandrel may be formed of a brittle material such as sintered metal or of a relatively low melting material and its destruction can be effected by longitudinal severance into strips and/or melting by induced current and/or fragmentation by ultrasound. Alternatively the mandrel may be made of soluble material and subsequently dissolved away. Endless reinforcements may also be circulated and the mandrel formed so as to partially embed said reinforcements. Corresponding apparatus is provided.

22 Claims, 10 Drawing Figures

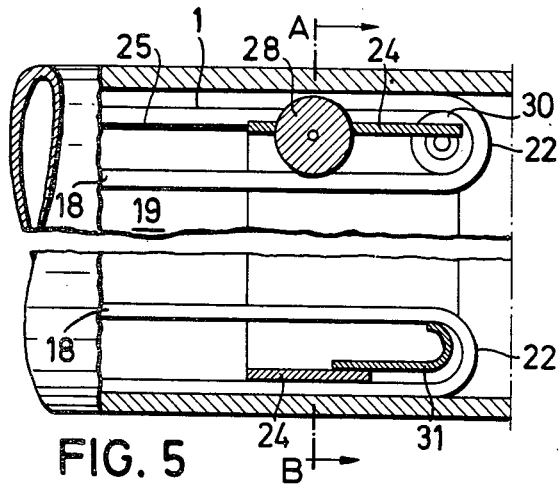
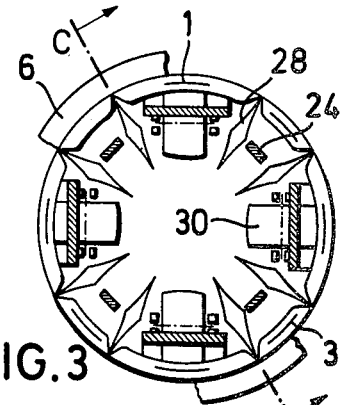
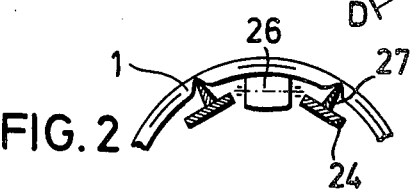
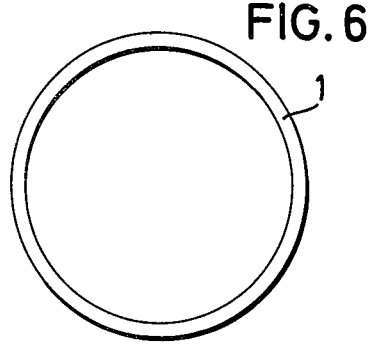
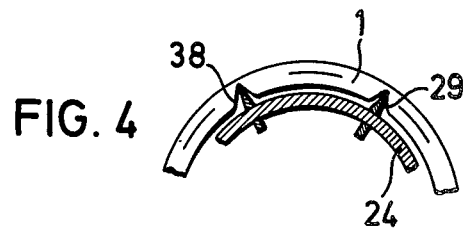
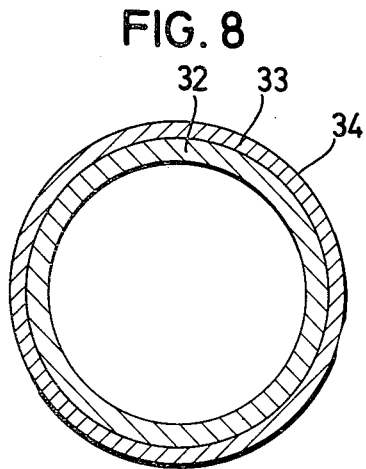
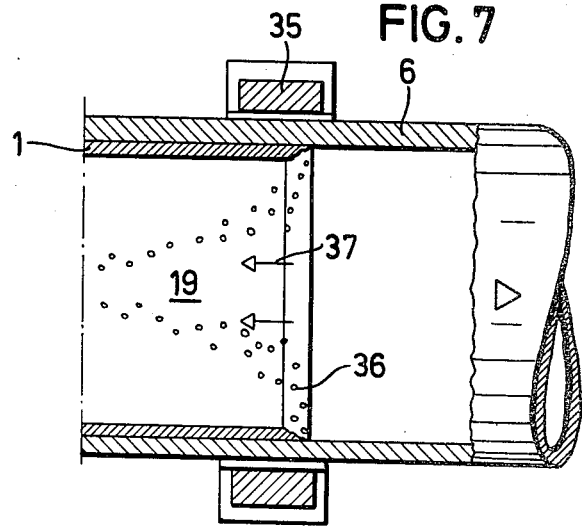

CONTINUOUS METHOD FOR MAKING HOSES WITH DESTRUCTION OF HORIZONTALLY DISPOSED MANDREL

This is a continuation of application Ser. No. 684,347, filed May 7, 1976 now U.S. Pat. No. 4,056,596.

BACKGROUND

The invention relates to a procedure for the continuous production of hoses made of composite materials, such as elastomers and reinforcing inserts, fashioned and heated on a mandrel.

The invention furthermore concerns apparatus for performing this procedure.

The known processes for the manufacture of high pressure hoses from composite materials with an elastic support material can basically be divided into mandrel manufacturing processes and mandrel-less processes.

In mandrel manufacturing processes, the individual material components of the hose, such as the core, the reinforcing insert and the covering, are applied individually to a mandrel of finite length serving as the forming core. The mandrel length is limited for reasons of easy "strippability" and amounts, as a rule, to from 20 to 40 meters. In discontinuous production a solid steel mandrel is usually used for small hose diameters, and an aluminum tube is used for larger diameters on account of greater ease in manipulation (German Pat. No. 521,226).

The mandrel-less processes are the only ones which until now have permitted continuous production of hoses of any desired length, since in this case the limitation of length by the need for ease in removing a mandrel is eliminated. The hose is built up in this case on a slightly compressed fluid, air as a rule. The establishment of the dimensions of the hose is achieved in these processes through the outside diameter, by applying a lead jacket before heating, for example, and removing it continuously again after the heating. In contrast to the mandrel process, the accuracy of the inside diameter in this case depends to a great extent on the material and machine parameters. Furthermore, the mandrel-less processes known today can be used economically only for large hose production and small hose dimensions ("Kautschuk und Gummi" magazine, February 1963, DK 678.06: 621.643,.3).

For the manufacture of high pressure hoses, especially those of large and very large dimensions, the mandrel process has heretofore been used exclusively. The reason for this is not so much the required constancy of the inside diameter, but essentially two facts: the metal or textile reinforcement used in making the hose must be fashioned under tension, which in the case of the mandrel-less process, where the inside diameter of the hose is great, would result in an unacceptable constriction of the core. In such cases it is not possible to increase the supporting air pressure, because this would also result in a deformation of the core, but in the opposite sense. On the other hand, jacketing with lead during the heating would result in manufacturing costs which could scarcely be considered reasonable.

Other reasons for the preference of the mandrel processes for the manufacture of high pressure hoses have to do with quality. It is virtually inevitable that, in the fashioning of a hose as a composite material, air will be trapped between the layers of material or the layers will contain some kind of gasifiable components, such as water or solvents, for example, which will be liberated by vulcanization and adversely affect, among other things, the adhesion between the individual layers. To counteract this influence, a high radial pressure is required in the hose cross section during the vulcanization phase, and it matters not whether this application of pressure is accomplished from the inside or the outside, or whether the hose laminations are supported on a pressure resistant outer jacket or on a pressure resistant internal mandrel. However, under identical radial pressure conditions the wall thicknesses of the supporting bodies differ greatly.

Thus, in the case of a hose with an inside diameter of 100 mm and an outside diameter of 120 mm, the wall thickness of an outer supporting jacket must be 4 times greater than that of an internal hollow mandrel in order to produce the same compression of the layers in the hose cross section and thus equal quality in the product. The comparable amount of the "mandrel material" that is used is even smaller by a factor of 7 in the case of external application of pressure.

In addition to this disadvantageous circumstance for the pressure jacket process, the limitation of the absolute internal pressure for the reasons described is a handicap which does not affect the mandrel process.

THE INVENTION

The invention is addressed to the problem of making available high pressure laminated hoses of great length having layers of elastic support material embedded as precisely as possible. On particular object is the production of large-size, flexible tubes of high internal pressure withstanding ability, having a high reproducible quality standard due to the nature of their manufacture.

This objective is accomplished by the invention by processes for the continuous production of hoses of composite materials, which are characterized by a hollow mandrel which is carried along during the build-up of the hose, and which is destroyed at the end of the production line and carried back within itself or within the hose.

In one preferred embodiment, the hollow mandrel produced at the beginning of the production line is separated at the end thereof, mechanically or thermally, into a plurality of strips which can be reflexed and carried back in the interior of the mandrel to the mandrel making machine. In another variant of the procedure of the invention, the mandrel cross section is wholly or partially melted at the end of the production line and carried back to the mandrel making machine by compressed air, for example. In two other variants of the procedure of the invention, the complete or partial disintegration of the hollow mandrel at the end of the production line is accomplished by mechanical distintegration into small and minute particles or by chemical dissolution. In another embodiment of the procedure of the invention it is possible to use several of these "mandrel disintegrating techniques" simultaneously or successively.

The prosess of the invention is furthermore characterized in that the finished hose is surrounded by extrusion with a certain amount of reusable material of appropriate thermal behavior for vulcanization purposes, so that on the one hand little or no vulcanization energy needs to be put in, and on the other hand the shrinkage of this jacketing supplies the required vulcanization pressure.

The invention will be further explained with the aid of the drawing, wherein known apparatus, not shown therein, are identified by Roman numerals.

FIG. 1(a) through 1(c) represent contiguous lengths of a single apparatus and are shown in diagrammatic cross-section taken through the hose manufacturing system of the invention;

FIG. 2 is a cross-section taken along line A–B of FIG. 5 through the hollow mandrel of the invention in accordance with Variant a, with the use of cutting tools for dividing the circular cross section into individual strips;

FIG. 3 is a cross-section taken along line A–B of FIG. 5 through the hollow mandrel of Variant a, showing the use of circular knives for dividing the circular cross section into individual strips;

FIG. 4 is a cross section taken along line A–B of FIG. 5 through the hollow mandrel of Variant a, showing the use of incandescent electrodes for dividing the circular cross section into individual strips;

FIG. 5 is a cross section taken along line C–D of FIG. 3 through the hollow mandrel of the invention;

FIG. 6 is a cross section taken through the hollow mandrel of the invention in Variant b, c or d;

FIG. 7 is a longitudinal cross section taken through the hose at the point of disintegration of the mandrel with the use of an induction coil;

FIG. 8 is a cross section taken through the hollow mandrel of the invention in Variant e.

Figure 1A:
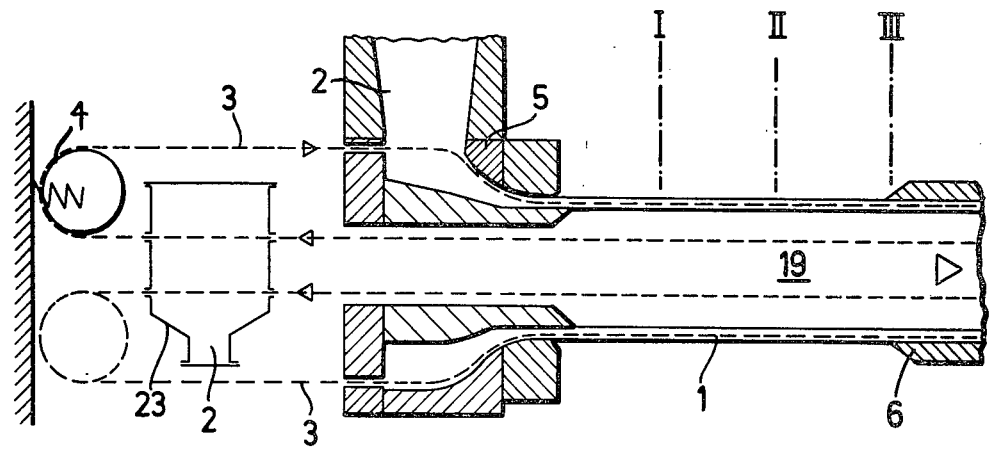
Figure 1B:
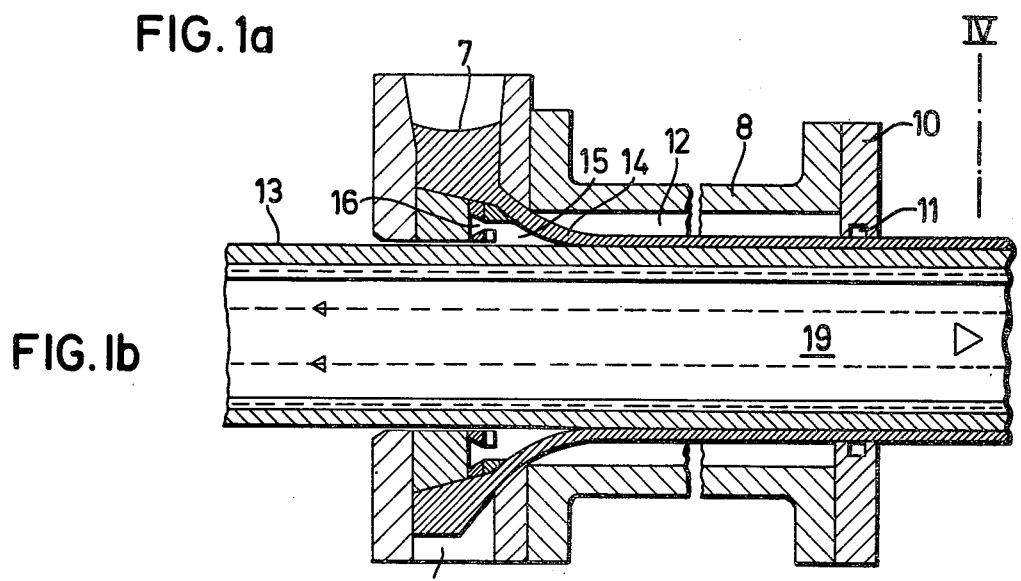
Figure 1C:
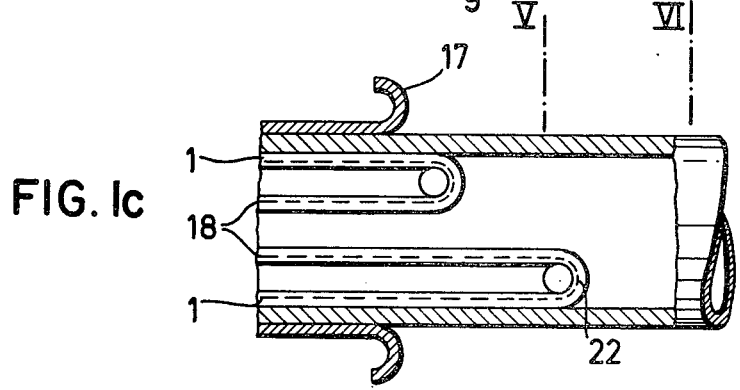

The procedure of the invention can be performed in five principal variants:

Variant a: Using a hollow mandrel as in FIGS. 1 to 5.

The mandrel 1 consists of a material 2 which is easily susceptible of plastic deformation, such as a lead-tin alloy, for example, in which reinforcements 3 are embedded to increase tensile strength and stiffness. The reinforcements pass over a tensioning device 4 into the mandrel making unit which is, for example, the transverse die 5 of a lead extruding machine, and there they are covered with the mandrel material 2.

After leaving the extruding machine the mandrel 1 is pulled by means of a circulating track type pulling device, not shown, at position II, first, advantageously, through a vacuum gauging bath, not shown, at position I, in which it is brought to a precise diameter and cooled down to about 200° C.

In the fabricating zone II the desired hose laminate 6 is built up on the mandrel, the latter being further transported by circulating track type pulling device, not shown.

The finished hose is then overcoated with a thermoplastic shrinking composition 7 and, if necessary, vulcanized in an autoclave 8. The overcoating is best performed in another transverse extruding machine 9 to which the autoclave is connected in a leak-proof manner. The sealing at the rearward end 10 of the autoclave is accomplished by means of known packing rings 11.

If the internal pressure required in the autoclave 12 results in premature contact between the unvulcanized hose surface 13 and the hot overcoating composition 14, the contact zone and contact temperature can be controlled by pumping a suitable fluid 15 under pressure through bores 16.

If the heat content of the overcoating composition 7 is sufficiently great to yield all of the required vulcanization heat to the hose, especially thin-walled hose, it will be sufficient to install a thermal insulating chamber instead of the autoclave. The overcoating composition is removed after the vulcanization of the hose is completed, and recycled to the extruding machine 9.

The internal mandrel 1, which is no longer needed, either, is in some suitable manner broken up into pieces of such size that they can be transported back through the mandrel interior 19 to the die 5, in the form of a strip 18, for example, of not too great a width. Most simply, this can be accomplished from the interior by a number of incandescent electrodes 29. By means of resistance heating, which can act in a locally limited manner only on the grooves 38 provided in the mandrel cross section for this purpose, these scorings, if not necessarily melted, are at least softened to such an extent that the mandrel cross section can be parted with relative ease into individual strips 18 by the flexing of the reinforcements 3 at 22.

In cases where the inside layer of the material of the hose cannot withstand such a brief, high thermal stress, the mandrel must be broken up inside the hose in some other manner. This can be accomplished, for example, by means of a cutter ring 24 which is held in position by cables 25, and slides or rolls at 26 inside of the mandrel. On the periphery of the said cutter ring, suitable severing tools can be fastened, such as for example cutting wedges 27, circular knives 28, incandescent electrodes 29, etc. Also, pulleys 30, as represented in the upper half of FIG. 5, or flexing guides 31 as represented in the lower half of FIG. 5, can be provided for a controlled flexing of the strips of the mandrel at the cutter ring 24.

After flexing, the strips of the mandrel pass back through the mandrel interior 19 and the die head 5 into a melting crucible 23 in which the mandrel material 2 is separated from the reinforcements and both can then re-enter the production circuit.

Variant b: Using a hollow mandrel in accordance with FIG. 6.

The hollow mandrel 1 consists of a uniform material cross section of a low-melting metal alloy 2 which is capable of constituting a sufficiently stiff hollow mandrel, expecially in the case of hose diameters of relatively small size. The mandrel is cut into strips 18 by means of a cutter ring 24 at the end of the production line and carried back, or, in the case of a hose core material capable of greater thermal stress, it is melted inductively from the outside by means of an induction heating device 35, and the molten droplets 36 are carried back by a current of compressed air (FIG. 7) into a receiver which is then positioned at the location of the melting crucible 23.

In certain cases it may be advisable first to soften the relatively thick-walled hollow mandrel by heating it and then cut it into relatively thin strips, since the latter can be cut and flexed more easily.

Variant c: Using a hollow mandrel as shown in FIG. 6, consisting entirely of a brittle material, such as a sintered material for example.

At the end of the production line a mandrel cross section of this kind can easily be broken up by mechanical force—by ultrasound for example—into such small particles that they can easily be blown back through the interior of the mandrel, by compressed air for example, and be reused.

Variant d: Using a hollow mandrel as shown in FIG. 6, consisting of a material that is shape-stable at the vulcanization temperature and can easily be dissolved chemically at lower temperatures.

Such a mandrel can be made, for example, of a salt having a suitable melting point. It is best not to dissolve a mandrel of this kind at the end of the production line, since otherwise the mandrel still needed in production would also suffer. Instead, it is desirable to wind up the finished hose together with the mandrel and then, in a subsequent procedure, to dissolve the hollow mandrel by passing a suitable solvent through it.

Variant e: Using a hollow mandrel representing some combination of mandrel types a to d.

For example, it may be advantageous to produce a hose continuously on a hollow mandrel constructed in the following manner (see FIG. 8):

The internal, supporting layer 32 consists of a low-melting metal tube. A brittle, sintered layer 33 of high melting point is laid over it, which has a good thermal insulating value but a relatively rough exterior surface. Therefore, a thin layer of a material that can easily be dissolved chemically is applied to it as the smooth coating 34, and the hollow mandrel thus prepared is transported into the hose making machine.

At the end of the production line, the individual mandrel layers 32, 33 and 34 are separated again by the employment of different techniques. First the internal metal tube 32 is inductively melted and pumped back through the hollow mandrel. The middle layer 33 in the meantime serves as a thermal barrier to protect the delicate core of the hose. Any grains of the sintered material that may be removed with the internal metal tube material 32 can easily be separated from the molten metal due to the high melting point of the sintered material.

After the removal of the innermost layer 32, the brittle middle layer 33 can be disintegrated by the action of mechanical force and its fragments can be carried back through the hollow mandrel. The outermost layer 34 can then be removed by washing it out with a suitable solvent, so that a high-gloss interior surface is produced inside the hose.

It will be appreciated that the instant specification and examples are set forth by way of illustration and not limitation, and that various modifications and changes may be made without departing from the spirit and scope of the present invention.

What is claimed is:

1. An apparatus for the continuous production and vulcanization of a hose comprising means for continuously forming a hollow mandrel, means for continuously moving said mandrel axially and horizontally only, forming said hose about said mandrel, means for continuously vulcanizing said hose while on said mandrel, means for continuously reducing said mandrel into remnants after vulcanization of said hose, and means for removing the remnants of said mandrel from within said hose.

2. The apparatus according to claim 1, wherein said means for continuous destruction of said mandrel includes a plurality of cutting elements positioned within said mandrel and serving to sever said mandrel into a plurality of longitudinal strips.

3. The apparatus according to claim 1, wherein said means for continuous destruction of said mandrel includes means for inducing a current or an ultrasound source positioned within said mandrel.

4. The apparatus according to claim 1, including means for applying an overcoating on said hose prior to vulcanization, and means for shrinking said overcoating.

5. The apparatus according to claim 1, including a plurality of endless tension reinforcements positioned longitudinally about a circle with an outer leg lying within the thickness of the mandrel and the inner return leg inside the hollow mandrel, and means for continuously advancing said reinforcements with their outer legs moving forwardly, the mandrel being formed so as to embed said outer legs which serve as reinforcements during hose formation and vulcanization.

6. An apparatus according to claim 1 further comprising means for removing said hollow mandrel within itself and returning said mandrel to said means for continuously forming a hollow mandrel whereby said mandrel is reformed and reused.

7. An apparatus according to claim 1 further comprising means for removing said hollow mandrel from within said hose and returning said mandrel to said means for continuously forming a hollow mandrel whereby said mandrel is reformed and reused.

8. An apparatus according to claim 1 wherein said hollow mandrel is formed of a plurality of belts moving lngitudinally in the same direction as said hose.

9. A process for the continuous production of a hose formed and vulcanized on a horizontally disposed mandrel, comprising continuously forming and advancing a hollow mandrel in a horizontal direction, continuously forming a hose of vulcanizable material about said mandrel and continuously vulcanizing said hose while advancing said hose in axial and horizontal directions only with said mandrel, after said mandrel arrives at a predetermined location continuously destroying said mandrel within said hose, and removing the remnants of said mandrel from said hose.

10. The process according to claim 9, wherein destruction of said mandrel is effected by longitudinally severing said mandrel into a plurality of strips, said strips are flexed and carried back within the hollow mandrel, are broken down into their components, and the components are recycled to the mandrel forming stage.

11. The process according to claim 9, wherein destruction of said mandrel is effected by an induced current or by ultrasound, and the components of the mandrel thus produced are carried away through the hollow mandrel itself or through the finished hose by means of a fluid.

12. The process according to claim 9, wherein said mandrel is formed from molten material of low melting point, said mandrel thereafter being cooled to solidify the material.

13. The process according to claim 9, wherein said mandrel comprises a soluble material of stable shape up to vulcanization temperature, the material being removed from the hose by dissolution.

14. A process according to claim 9 wherein the destroyed mandrel at the end of the production line is carried back within itself and reformed and re-employed as an advancing hollow mandrel.

15. A process according to claim 9 wherein the destroyed mandrel at the end of the production line is carried back within said hose and reformed and re-employed as an advancing hollow mandrel.

16. A process according to claim 9 wherein said hollow mandrel is formed of a plurality of belts moving longitudinally in the same direction as said hose.

17. The process according to claim 9, wherein said mandrel comprises a material which is brittle.

18. The process according to claim 17, wherein said material is sintered metal.

19. The process according to claim 9, including the additional steps of cntinuously applying a heat-resistant overcoating to the outer surface of the hose prior to vulcanization, and shrinking said overcoating, whereby pressure is produced on the hose to facilitate vulcanization.

20. The process according to claim 19, wherein the application of the overcoating to the hose prior to the vulcanization is effected with the aid of a continuously operating seal against high internal pressure in an autoclave in which vulcanization is subsequently effected.

21. The process according to claim 19, including the further steps of continuously removing the overcoating after vulcanization and continuously returning the components of the overcoating to the coating application stage.

22. The process according to claim 21, including the further step of continuously advancing and returning a plurality of deformable endless tension reinforcements, the mandrel being formed about said reinforcements which become embedded therein, at the destruction stage said reinforcements being separated and returned within the hollow mandrel for re-use.

* * * * *